US010443948B2

(12) United States Patent
Seo

(10) Patent No.: US 10,443,948 B2
(45) Date of Patent: Oct. 15, 2019

(54) HEAT EXCHANGER FOR VEHICLE HAVING HOUSING WITH HEAT EXCHANGE CORE INSTALLED THEREIN

(71) Applicants: HYUNDAI MOTOR COMPANY, Seoul (KR); KIA MOTORS CORPORATION, Seoul (KR)

(72) Inventor: Jung Min Seo, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 99 days.

(21) Appl. No.: 15/612,055

(22) Filed: Jun. 2, 2017

(65) Prior Publication Data

US 2018/0164039 A1 Jun. 14, 2018

(30) Foreign Application Priority Data

Dec. 14, 2016 (KR) ........................ 10-2016-0170232

(51) Int. Cl.
*F28F 3/14* (2006.01)
*B60H 1/00* (2006.01)
(Continued)

(52) U.S. Cl.
CPC ........... *F28D 9/0006* (2013.01); *F02M 26/32* (2016.02); *F28D 9/0031* (2013.01);
(Continued)

(58) Field of Classification Search
CPC .. F28D 9/0006; F28D 9/0031; F28F 2280/00; F02M 26/32
(Continued)

(56) References Cited

U.S. PATENT DOCUMENTS 4,201,262 A 5/1980 Goldstein
4,492,186 A * 1/1985 Helm .................... F22B 37/483 122/382
(Continued)

FOREIGN PATENT DOCUMENTS

DE 3706527 A1 * 9/1988 ............... F28D 7/06
DE 103 50 521 A1 6/2005
(Continued)

OTHER PUBLICATIONS

Translation of DE-3706527-A1 entitled Translation-DE-3706527-A1 (Year: 1988).*
(Continued)

*Primary Examiner* — Paul Alvare
(74) *Attorney, Agent, or Firm* — Morgan, Lewis & Bockius LLP

(57) ABSTRACT

A heat exchanger for a vehicle includes: a housing having an interior space; a header installed at one end of the housing and having a first fluid inlet manifold; a second fluid inlet manifold; and a second fluid outlet manifold; and a heat exchange core installed in the interior of the housing and having a plurality of core elements spaced apart from each other. The plurality of core elements are coupled to the header, and a plurality of first fluid passage, through which the first fluid passes, is respectively formed between the adjacent core elements. Each of the core elements has a second fluid passage, through which the second fluid flows, an inlet of the second fluid passage communicates with the second fluid inlet manifold, and an outlet of the second fluid passage communicates with the second fluid outlet manifold.

15 Claims, 13 Drawing Sheets

(51) Int. Cl.

| | |
|---|---|
| ***F28G 1/12*** | (2006.01) |
| ***F28D 7/10*** | (2006.01) |
| ***F28D 7/06*** | (2006.01) |
| ***F28D 9/00*** | (2006.01) |
| ***F02M 26/32*** | (2016.01) |
| ***F28F 9/007*** | (2006.01) |
| ***F28G 9/00*** | (2006.01) |
| *F28F 9/02* | (2006.01) |

(52) U.S. Cl.
CPC .......... *F28D 9/0081* (2013.01); *F28F 9/0075* (2013.01); *F28G 9/00* (2013.01); *F28F 2009/0287* (2013.01)

(58) Field of Classification Search
USPC ........ 165/73, 74, 141, 157, 41, 95, 170, 176
See application file for complete search history.

(56) References Cited

U.S. PATENT DOCUMENTS

| | | | | |
|---|---|---|---|---|
| 4,905,900 | A * | 3/1990 | Scharton | F22B 37/483 122/382 |
| 4,966,230 | A * | 10/1990 | Hughes | F28D 1/035 165/150 |
| 6,250,379 | B1 * | 6/2001 | Geissler | A23C 3/033 165/145 |
| 7,044,207 | B1 * | 5/2006 | Guidat | F28D 9/0006 165/166 |
| 7,287,378 | B2 | 10/2007 | Chen et al. | |
| 8,596,339 | B2 | 12/2013 | Palanchon | |
| 9,429,087 | B2 | 8/2016 | Iwai et al. | |
| 10,107,236 | B2 | 10/2018 | Kuske et al. | |
| 2004/0074480 | A1 | 4/2004 | Chen et al. | |
| 2007/0017489 | A1 | 1/2007 | Kuroki et al. | |
| 2009/0056909 | A1 | 3/2009 | Braun | |
| 2009/0260605 | A1 | 10/2009 | Janssen et al. | |
| 2009/0277606 | A1 * | 11/2009 | Reiss, III | F28D 7/1692 165/69 |
| 2011/0203781 | A1 * | 8/2011 | Ellingwood | F24H 1/403 165/173 |
| 2012/0117989 | A1 | 5/2012 | Turney et al. | |
| 2013/0244077 | A1 | 9/2013 | Palanchon et al. | |
| 2014/0017545 | A1 | 1/2014 | Palanchon | |
| 2014/0076528 | A1 | 3/2014 | Daly et al. | |
| 2014/0373798 | A1 * | 12/2014 | Alfano | F01N 5/02 123/142.5 R |
| 2015/0226143 | A1 | 8/2015 | Iwai et al. | |
| 2017/0198665 | A1 | 7/2017 | Kuske et al. | |
| 2017/0306897 | A1 | 10/2017 | Nam | |
| 2018/0051660 | A1 | 2/2018 | Marsh et al. | |

FOREIGN PATENT DOCUMENTS

| | | | |
|---|---|---|---|
| DE | 10 2007 002 459 | A1 | 7/2007 |
| EP | 3 284 925 | A1 | 2/2018 |
| FR | 2 905 735 | A1 | 3/2008 |
| FR | 2 925 351 | A1 | 6/2009 |
| FR | 2 930 280 | A1 | 10/2009 |
| FR | 2 938 321 | A1 | 5/2010 |
| JP | 5896484 | B2 | 3/2016 |
| KR | 10-0925816 | B1 | 11/2009 |
| WO | 2013/151079 | A1 | 10/2013 |

OTHER PUBLICATIONS

U.S. Office Action issued in U.S. Appl. No. 15/633,217 dated Aug. 27, 2018.

Non-Final Office Action issued in related U.S. Appl. No. 15/641,920 dated Jun. 14, 2019.

* cited by examiner

HEAT EXCHANGER FOR VEHICLE HAVING HOUSING WITH HEAT EXCHANGE CORE INSTALLED THEREIN

CROSS-REFERENCE TO RELATED APPLICATION

This application is based on and claims the benefit of priority to Korean Patent Application No. 10-2016-0170232, filed on Dec. 14, 2016, in the Korean Intellectual Property Office, the disclosure of which is incorporated herein in its entirety by reference.

TECHNICAL FIELD

The present disclosure relates to a heat exchanger for a vehicle, and more particularly, to a heat exchanger that may improve a heat transfer performance between two or more fluids.

BACKGROUND

A heat exchanger is an apparatus that transfers heat between two or more fluids. The heat exchanger may be applied to various industrial fields, such as vehicles, boilers, ships, and facilities.

Such heat exchangers include various types, such as a pin tube type heat exchanger, a shell tube type heat exchanger, and a pin type heat exchanger.

The pin tube type heat exchanger may be easily manufactured, but the durability of the pins may be lowered and heat transfer efficiency may deteriorate. The shell tube type heat exchanger has an excellent pressure-resistant property and high component reliability, but the structure of the shell tube type heat exchanger is complex and the weight thereof is heavy. The plate type heat exchanger has an excellent pressure-resistant property (of not less than 200 bars) and has high heat transfer efficiency, but the degree of freedom of installation is limited.

A heat exchanger for a vehicle, such as an EGR cooler, an exhaust boiler or an EGR gas boiler of a waste heat recovery system is a technology of recovering thermal energy as a thermal fluid such as EGR gas or exhaust gas exchanges heat with a coolant such as cooling water or working fluid, and the heat exchanger for a vehicle may have a high pressure condition of a maximum of 30 bars or a high temperature condition, and the high-temperature/high-pressure condition may influence the durability of the components.

Meanwhile, because the shell tube type heat exchanger may be widely used due to its excellent pressure-resistant property and component reliability and may secure a widely larger installation space in a plant or a ship, the shell tube type heat exchanger may be used without limitation, but as the installation space in a vehicle is relatively narrow, the degree of freedom of design, the reliability of components, and the easiness of the maintenance and repair have to be considered when the shell tube type heat exchanger is applied.

In this way, in the shell tube type heat exchanger according to the related art, because the shells have to be pressure-resistant containers having a sufficient pressure-resistant property as coolant of a high pressure (not less than 30 bars) passes through the interior space of the shells, and the outsides of the shells have to be separately insulated to prevent heat recovered from the thermal fluid from being dissipated to the outside, manufacturing costs of the shell tube type heat exchanger are high.

Further, as the thermal fluid, such as exhaust gas or EGR gas, passes through the heat exchanger tube of the conventional shell tube type heat exchanger, particulate matters (PMs) may be attached to the inner surface of the heat exchanger tube, and accordingly, the heat exchanger performance may become very low as the interior of the heat exchanger tube is blocked.

Further, according to the conventional shell tube type heat exchanger, the heat exchanger tube installed in the interiors of the shell cannot be easily separated, and accordingly, contaminants, such as the particulate matters, cannot be easily washed.

SUMMARY

The present disclosure provides a heat exchanger for a vehicle that may improve heat transfer performance and effectively realize the degree of freedom of design, the reliability of components, and the easiness of washing.

The technical objects of the present disclosure are not limited to the above-mentioned one, and the other unmentioned technical objects will become apparent to those skilled in the art from the following description.

In accordance with an aspect of the present disclosure, a heat exchanger for a vehicle includes: a housing having an interior space, through which a first fluid passes; a header installed at one end of the housing, and having a first fluid inlet manifold, through which the first fluid is introduced; a second fluid inlet manifold, through which a second fluid is introduced; and a second fluid outlet manifold, through which the second fluid is discharged, and a heat exchange core installed in the interior space of the housing and having a plurality of core elements spaced apart from each other. The plurality of core elements are coupled to the header, and plurality of first fluid passage, through which the first fluid passes, is respectively formed between adjacent core elements. Each of the core elements has a second fluid passage, through which the second fluid flows, an inlet of the second fluid passage communicates with the second fluid inlet manifold, and an outlet of the second fluid passage communicates with the second fluid outlet manifold.

An inlet port, through which the first fluid is introduced, may be formed at one end of the first fluid inlet manifold, and a first chamber communicating with the inlet port may be formed in an interior of the first fluid inlet manifold.

The header may have a plurality of communication apertures communicating with the first chamber, and the plurality of communication apertures may communicate with the plurality of first fluid passages, respectively.

A second fluid inlet port, through which the second fluid is introduced, may be formed at an end of the second fluid inlet manifold, and a second chamber communicating with the second fluid inlet port may be formed in an interior of the second fluid inlet manifold.

A plurality of communication passages communicating with the second chamber may be formed at a back portion of the header, and the plurality of communication passages may be connected to inlets of the plurality of core elements, respectively.

A second fluid outlet port, through which the second fluid is discharged, may be formed at an end of the second fluid outlet manifold, and a third chamber communicating with the second fluid outlet port may be formed in an interior of the second fluid outlet manifold.

A plurality of communication passages communicating with the third chamber may be formed, and the plurality of communication passages may be connected to outlets of the plurality of core elements, respectively.

Each of the core elements may include a pair of opposing half shells, a groove may be formed in each of the half shells, and the pair of half shells may be jointed together.

A plurality of baffles may be interposed between the core elements.

A plurality of fitting grooves may be alternately arranged between the plurality of communication apertures, and the plurality of core elements may be inserted into and coupled to the plurality of fitting grooves, respectively.

Front ends of the core elements may be detachably inserted into and coupled to the header.

Upper ends of the core elements may be detachably coupled to a top of the housing.

Lower ends of the core elements may be detachably coupled to a bottom of the housing.

Rear ends of the core elements may be connected to each other to be supported by the support member.

Opposite ends of the support member may be detachably coupled to opposite inner surfaces of the housing.

The core elements may be elastically supported against an inner surface of the housing by two or more resilient members.

A washing water injection hole for injecting washing water may be formed on one side of the housing.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, the sizes of the components and the thickness of the lines of the drawings may be rather exaggerated for convenience of understanding. Further, the terms used in the description of the present disclosure may be different according to the users, the intentions of the operators, or the customs in consideration of the functions in the present disclosure. Therefore, definition of the terms should be made according to the overall disclosure set forth herein.

Referring to FIGS. 1 to 10, a heat exchanger 10 for a vehicle according to various embodiments of the present disclosure may include a housing 11, and a heat exchange core 20 installed within the housing 11.

Figure 1:
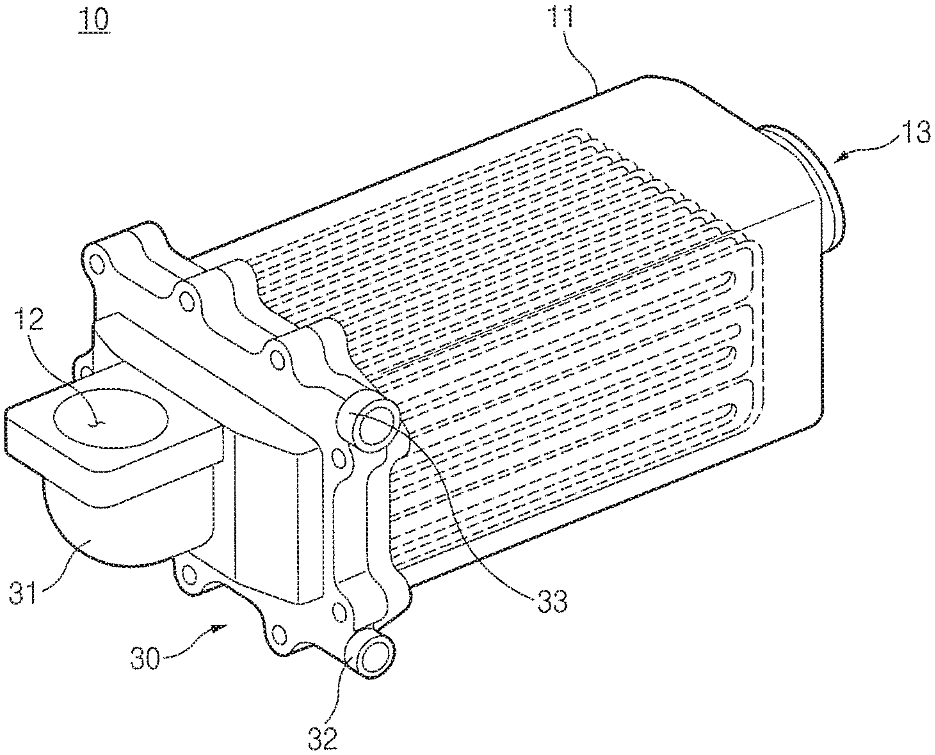
FIG. 1 is a perspective view illustrating a heat exchanger for a vehicle according to an embodiment of the Present disclosure.
Figure 3:
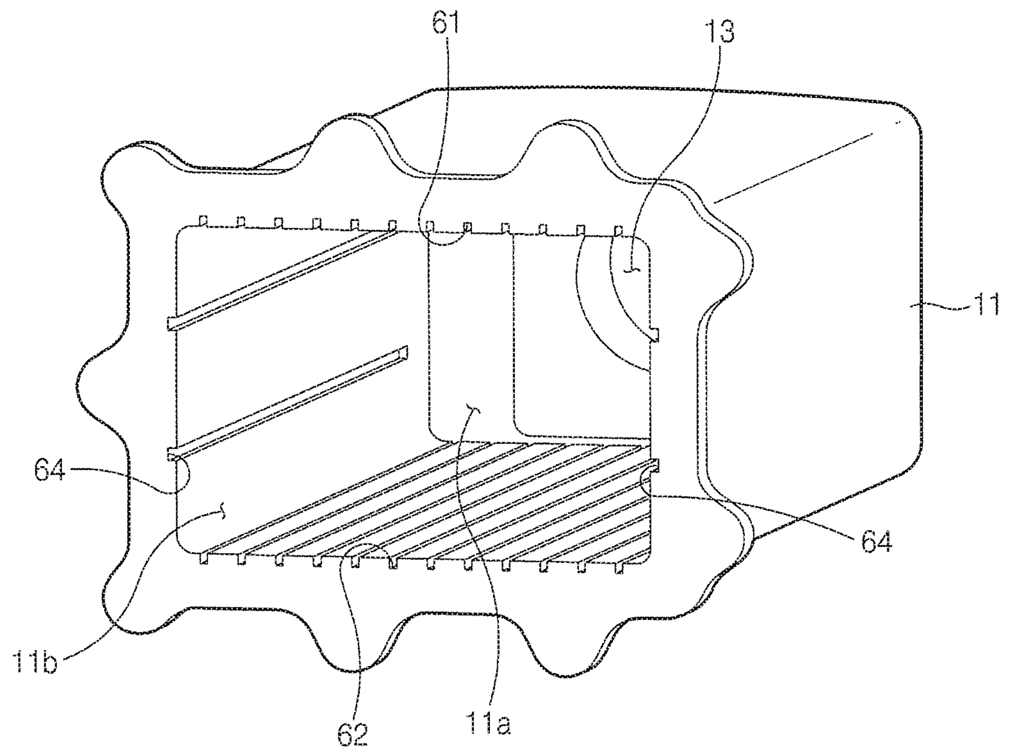
FIG. 3 is a perspective view illustrating a housing of the heat exchanger for a vehicle according to an embodiment of the present disclosure.
Figure 4:
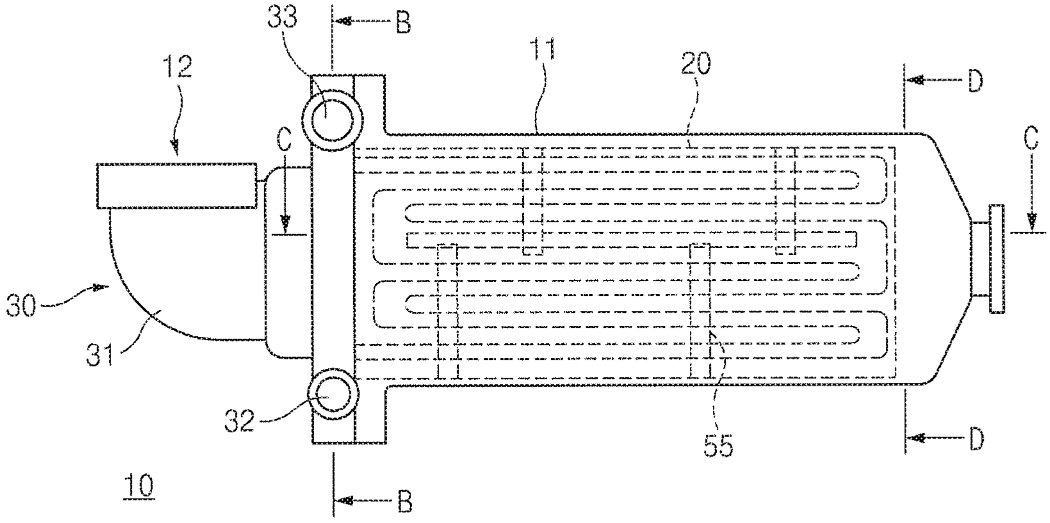
FIG. 4 is a side view illustrating the heat exchanger for a vehicle according to an embodiment of the present disclosure.
Figure 5:
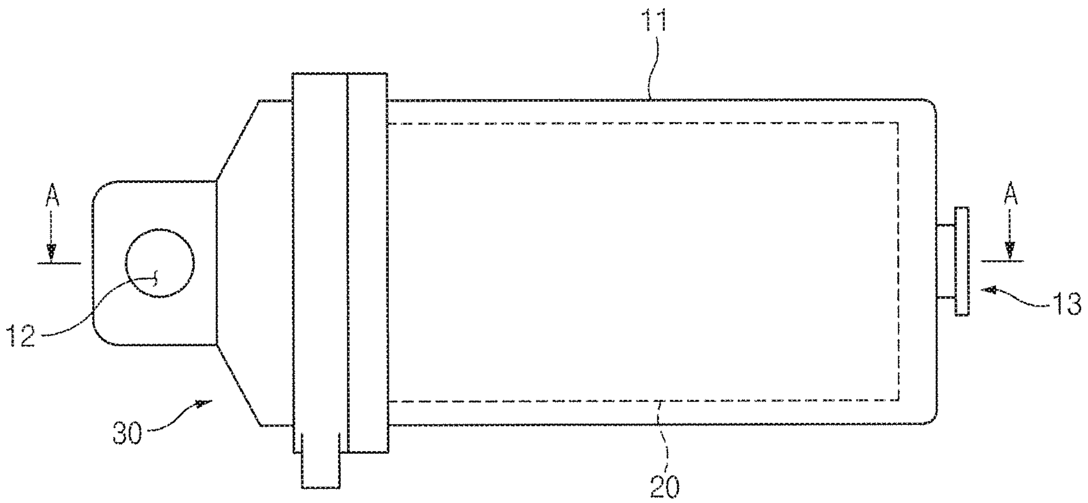
FIG. 5 is a plan view illustrating the heat exchanger for a vehicle according to an embodiment of the present disclosure.

Referring to FIGS. 1 and 3, the housing 11 may have an interior space 11*a*, through which a first fluid passes. An opening 11*b* may be installed at one end of the housing 11, a header 30 may be installed in the opening 11*b* of the housing 11 to be sealed, a heat exchange core 20 may be connected to the header 30, and a second fluid may circulate in the interior of the heat exchange core 20.

The housing 11 may have an inlet port 12, through which the first fluid is introduced, and an outlet port 13, through which the first fluid is discharged.

Figure 2:
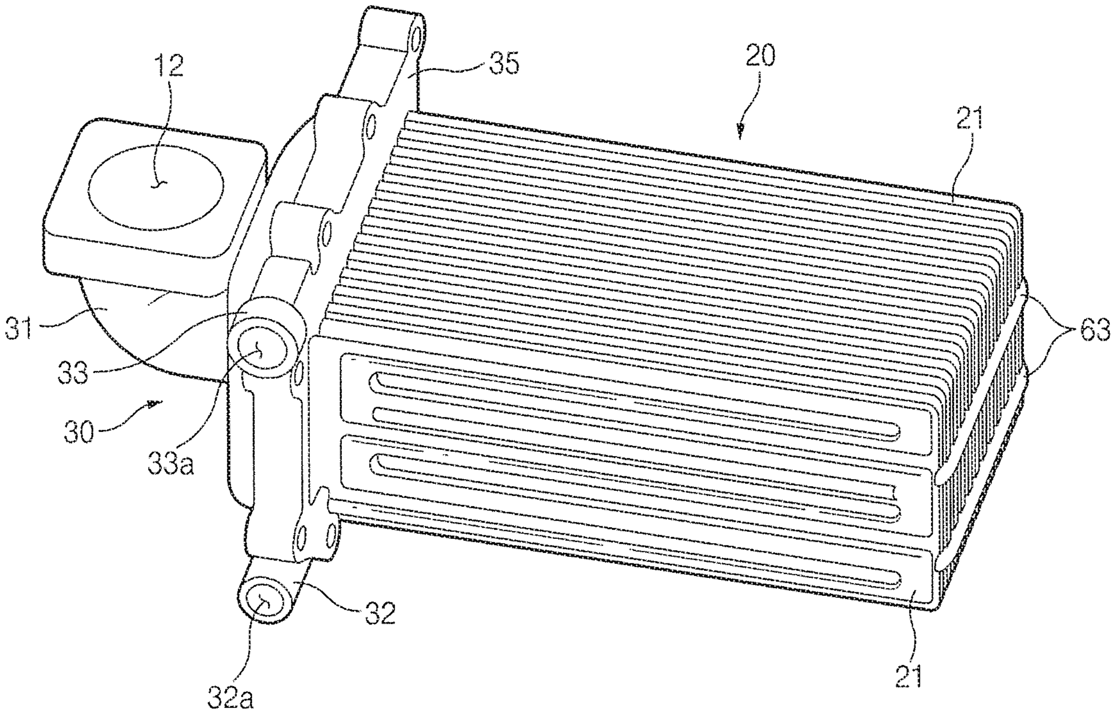
FIG. 2 is a perspective view illustrating a heat exchange core of the heat exchanger for a vehicle according to an embodiment of the present disclosure.

The heat exchange core 20 may be installed in the interior space 11*a* of the housing 11, and as illustrated in FIG. 2, the heat exchange core 20 may include a plurality of core elements 21.

Figure 9:
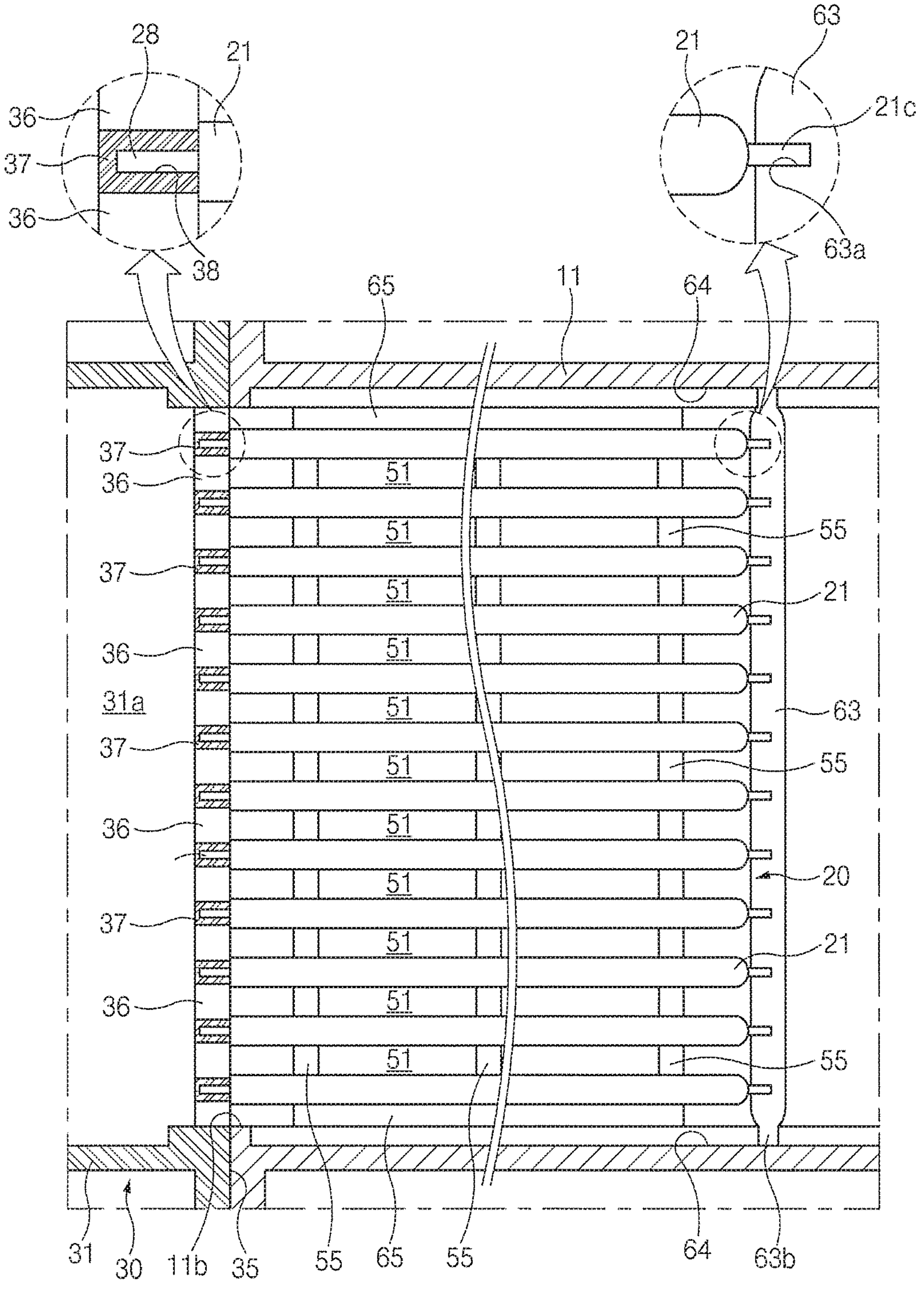
FIG. 9 is a sectional view taken along line D-D of FIG. 4.

The plurality of core elements 21 may be stacked, and as illustrated in FIG. 9, the plurality of the core elements 21 may be spaced apart from each other such that first fluid passages 51, through which the first fluid passes, may be formed between adjacent core elements 21.

According to an embodiment of the present disclosure, the first fluid may be a thermal fluid, such as exhaust gas or exhaust gas recirculation (EGR) gas, a temperature of which is relatively high, and the second fluid may be a low-temperature fluid, such as cooling water or working fluid, a temperature of which is lower than that of the first fluid.

Figure 8:
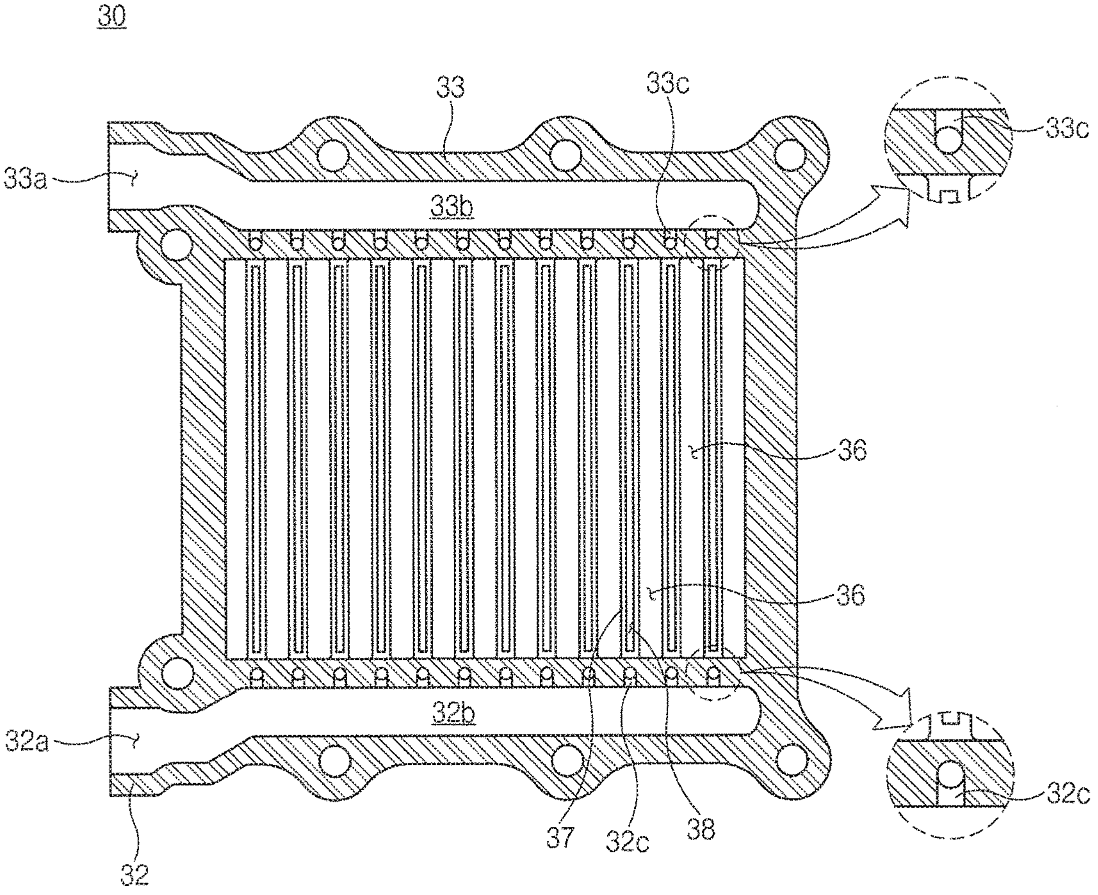
FIG. 8 is a sectional view taken, along line C-C of FIG. 4.

As illustrated in FIG. 2, the core elements 21 may be installed vertically uprights, and accordingly, as illustrated in FIG. 8, the core elements 21 may be horizontally spaced apart from each other.

As illustrated in FIGS. 1, 2, 4, and 5, the header 30 may include a first fluid inlet manifold 31, a second fluid inlet manifold 32, a second fluid outlet manifold, and an end wall 35 to which the heat exchange core 20 is coupled.

The first fluid inlet manifold 31, the second fluid inlet manifold 32, and the second fluid outlet manifold 33 may be unitarily provided at a front portion of the header 30.

The end wall 35 is formed at a back portion of the header 30, and the end wall 35 may close the opening lib of the housing 11 such that the opening 11*b* of the housing 11 may be sealed.

An inlet port 12, through which the first fluid is introduced, may be formed at an end of the first fluid inlet manifold 31, and a first chamber 31*a* communicating with the inlet port 12 may be formed in an interior of the first fluid inlet manifold 31. In this way, because the first fluid, such as EGR gas, exhaust gas, or the like, may be preliminarily cooled by the second fluid, such as working fluid, cooling water, or the like, as the first chamber 31*a* is formed unitarily together with the second fluid inlet manifold 32 and the second fluid outlet manifold 33 in the header 30, a cooling efficiency of the first fluid may be further improved.

Figure 7:
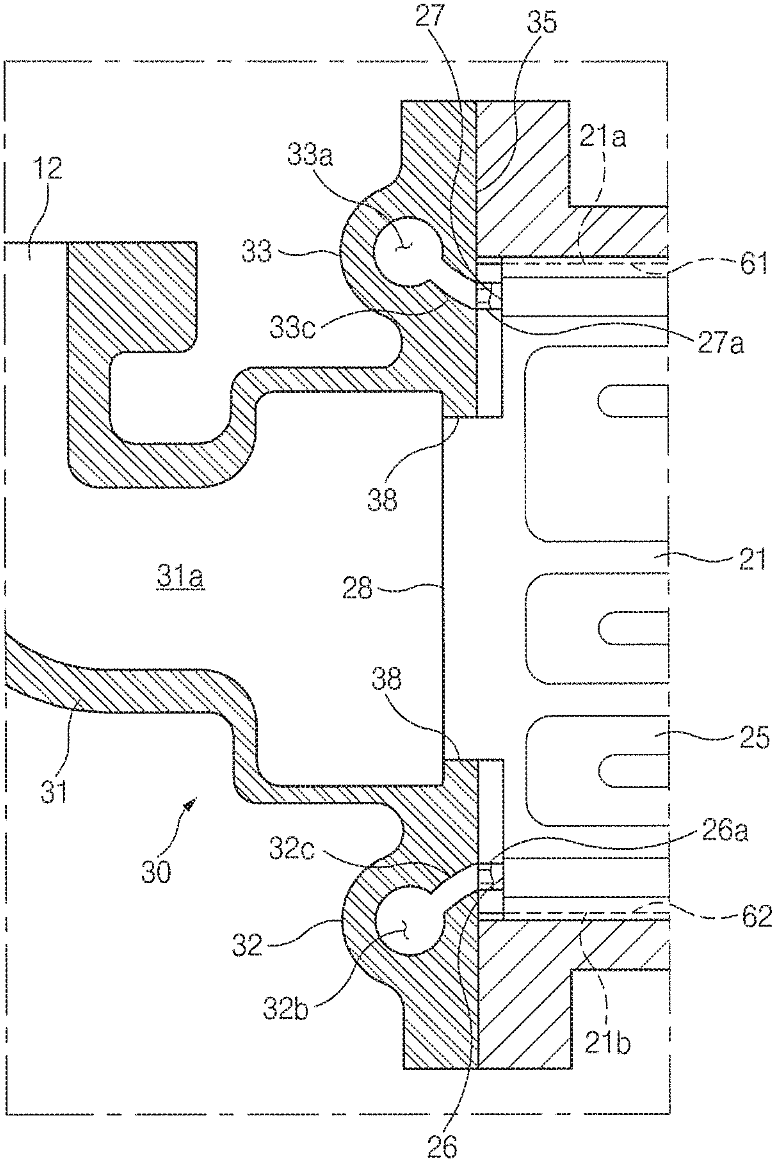
FIG. 7 is an enlarged view of a portion of arrow B of FIG. 6.

As illustrated in FIGS. 7 to 9, the end wall 35 may be formed at a back portion of the header 30, and the end wall 35 may close the opening 11*b* of the housing 11. A plurality of communication apertures 36 communicating with the first chamber 31*a* may be formed in the end wall 35, and a plurality of communication apertures 36 may be spaced apart from each other along a horizontal direction. The communication apertures 36 may extend in the end wall 35 in a vertical direction. As illustrated in FIG. 9, the communication apertures 36 may be configured to communicate with a plurality of first fluid passages 51 formed between the core elements 21. Accordingly, the first fluid introduced through the inlet port 12 may pass through the plurality of first fluid passages 51 after being distributed to the plurality of communication apertures 36 through the first chamber 31*a*.

As illustrated in FIGS. 7 to 9, as the plurality of communication apertures 36 are formed in the end wall 35 to be spaced apart from each other by a specific interval, plurality of ribs 37 may be formed between the communication apertures 36. The plurality of ribs 37 may extend in a vertical direction. A plurality of fitting grooves 38 may be respectively formed in the plurality of ribs 37, and accordingly, as illustrated in FIGS. 8 and 9, the plurality of fitting grooves 38 and the plurality of communication apertures 36 may be alternately formed. The plurality of core elements may be respectively inserted into and coupled to the plurality of fitting grooves 38. The fitting grooves 38 may extend in a vertical direction, and the plurality of fitting grooves 38 may be spaced apart from each other by a specific interval along a horizontal direction.

As illustrated in FIGS. 7 and 8, a second fluid inlet port 32*a*, through which the second fluid is introduced, may be formed at an end of the second fluid inlet manifold 32. As illustrated in FIGS. 7 and 9, a second chamber 32*b* communicating with the second fluid inlet port 32*a* may be formed in an interior of the second fluid inlet manifold 32. As illustrated in FIG. 7, a plurality of communication passages 32*c* communicating with the second chamber 32*b* may be formed in the end wall 35. Accordingly, the second fluid introduced through the second fluid inlet port 32*a* may be introduced into inlets 26 of the core elements 21 after being distributed to the plurality of communication passages 32*c* through the second chamber 32*b*.

As illustrated in FIGS. 7 and 8, a second fluid outlet port 33*a*, through the second fluid is discharged, may be formed at an end of the second fluid outlet manifold 33. As illustrated in FIGS. 7 and 8, a third chamber 33*b* communicating with the second fluid outlet port 33*a* may be formed in an interior of the second fluid outlet manifold 33. As illustrated in FIG. 7, a plurality of communication passages 33*c* communicating with the third chamber 33*b* may be famed in the end wall 35. Accordingly, the second fluid may be discharged through the second fluid outlet port 33*a* after merging in the third chamber 33*b* via the plurality of communication passages 33*c* at the outlets 27 of the core elements 21.

In this way, the core elements 21 of the heat exchange core 20 may be connected to the second fluid inlet manifold 32 and the second fluid outlet manifold 33 of the header 30, and accordingly, the second fluid may circulate in an interior of the core elements 21 of the heat exchange core 20.

According to an, embodiment, as illustrated in FIGS. 2, 6, 7, and 8, the second fluid inlet manifold 32 may be disposed at a lower portion of the header 30 and the second fluid manifold 33 may be disposed at an upper portion of the header 30. Accordingly, the inlets 26 of the core elements 21 may be located at a lower portion of the housing 11, and the outlets 27 of the core elements 21 may be located at an upper portion of the housing 11. When the second fluid is a working fluid of a Rankine cycle, the second fluid, which is a working fluid, may be vaporized from a liquid phase to a vapor phase through heat exchange with the first fluid, which is a thermal fluid as it passes through second fluid passages 25 of the core elements 21. Accordingly, the second fluid, which is a working fluid, may be more stably vaporized from a liquid phase to a vapor phase while flowing from a lower side to an upper side in the second fluid passages 25 of the core elements 21.

The heat exchange core 20 may include a plurality of core elements 21 connected to the header 30.

Figure 11:
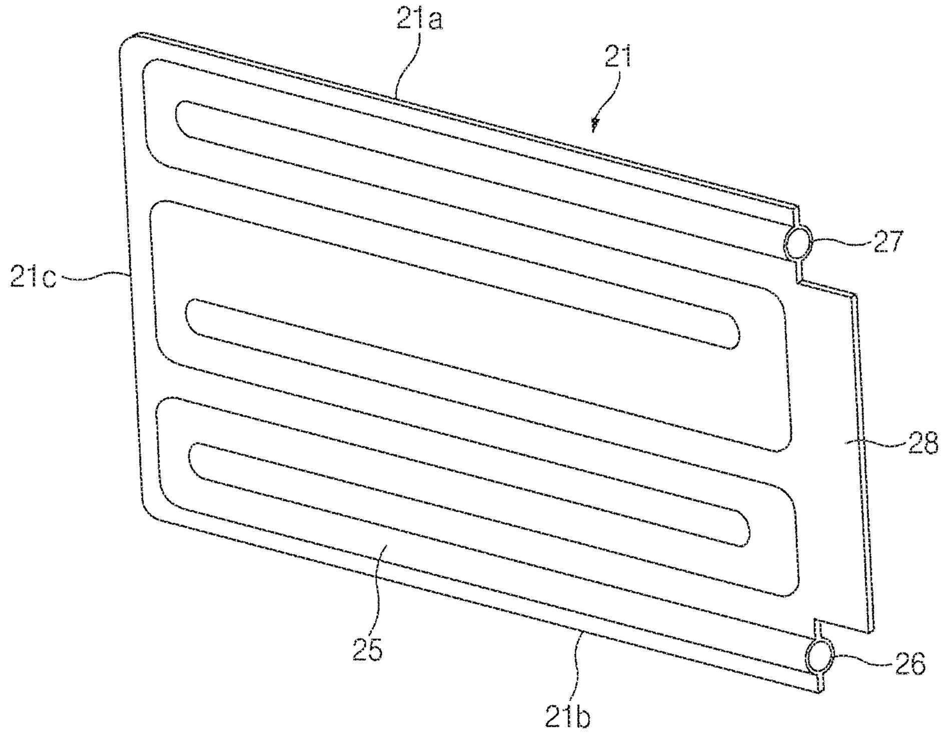
FIG. 11 is a perspective view illustrating a core element of the heat exchange core according to an embodiment of the present disclosure.
Figure 12:
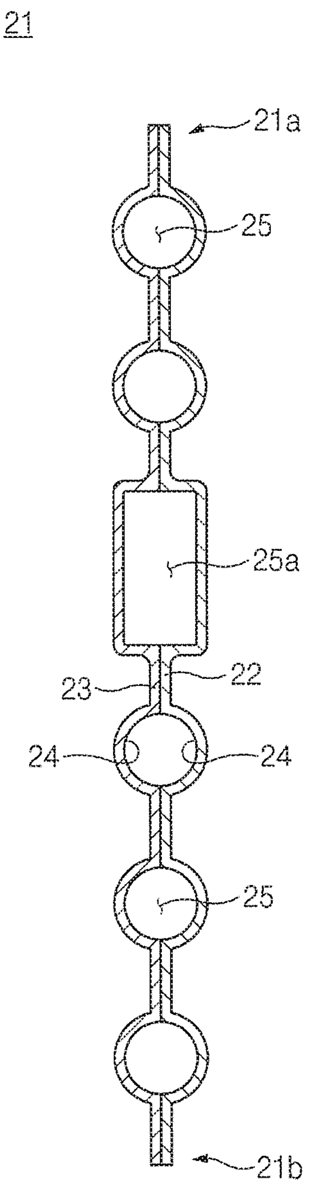
FIG. 12 is a front sectional view illustrating the core element of the heat exchange core according to an embodiment of the present disclosure.

Referring to FIGS. 11 and 12, each of the core elements 21 may include a second fluid passage 25, through which the second fluid circulates. The second fluid passage 25 may be formed in a serpentine or reversing path, and accordingly, heat exchange performance may be improved by enlarging a heat exchange contact area. The second fluid passage 25 may have an inlet 26, through which the second fluid is introduced, and an outlet 27, through which the second fluid is discharged, and the inlet 26 may communicate with the communication passages 32*c* of the second fluid manifold 32 and the outlet 27 may communicate with the communication passages 33*c* of the second fluid manifold 33.

Referring to FIGS. 11 and 12, each of the core elements 21 may include a pair of opposing half shells 22 and 23, and grooves 24 for forming the second fluid passage 25 may be formed in the half shells 22 and 23. The half shells 22 and 23 may be thin plates having a thickness of 0.5 mm. The pair of half shells 22 and 23 may be jointed together through blazing welding.

In this way, according to an embodiment of the present disclosure, the half shells 22 and 23 of the core elements 21 are formed of thin plates of about 0.5 mm, the grooves 24 of the half shells 22 and 23 may be easily machined through pressing, and the pair of half shells 22 and 23 may be easily coupled to each other through blazing welding, a pressure-resistant performance corresponding to about 30 bars may be secured, a contact area between two fluids may be maximized as compared with the conventional shell tube heat exchanger, and a degree of freedom of design, for example, of a structure or shape of the second fluid passage 25 may become high.

According to an embodiment of the present disclosure, the second fluid passage 25 may have a circular section, and accordingly, the pressure-resistant performance of the second fluid passage 25 may be improved.

According to an embodiment of the present disclosure, the second fluid passage 25*a* of a portion of the second fluid passage 25 may have a flat rectangular cross-section and the rectangular cross-section may have rounded corners. In this way, because the second fluid passage 25*a* having the rectangular cross-section may have a volume that is larger than that of the second fluid passage 25 having the circular cross-section and the second fluid passage 25*a* having the rectangular cross-section may be disposed between the second fluid passage having the circular cross-section, the fluid may be vaporized from a liquid state to a gas state more stably.

Figure 13:
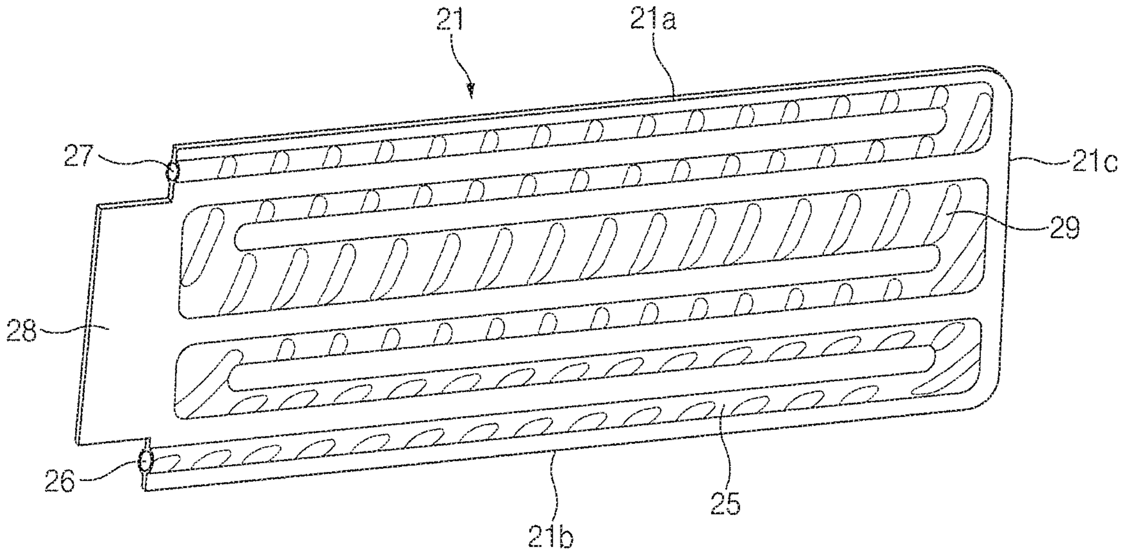
FIG. 13 is a perspective view illustrating a core element of the heat exchange core according to another embodiment of the present disclosure.

According to another embodiment of the present disclosure, as illustrated in FIG. 13, a bead 29 having a specific shape may be formed on an outer surface of a portion at which the second fluid passage 25 is formed, and accordingly, heat exchange performance may be further improved.

In this way, according to an embodiment of the present disclosure, because the first fluid is a thermal fluid such as EGR gas or exhaust gas, the second fluid is a low-temperature fluid, such as cooling water or working fluid, a temperature of which is lower than the temperature of the first fluid, the first fluid passes through the first fluid passage 51 of the housing 11, and the second fluid circulate in the second fluid passage 25 of the core element 21, pressure-resistant property and durability may be secured through the core elements having a thin plate half shell structure without applying a separate pressure-resistant container.

As illustrated in FIG. 7, the inlet 26 of the core element 21 may be connected to the communication passage 32*c* of the second chamber 32*b* through a connection piece 26*a* to communicate with the communication passage 32*c* of the second chamber 32*b*. The outlet 27 of the core element 21 may be connected to the communication passage 33*c* of the third chamber 33*b* through a connection piece 27*a* to communicate with the communication passage 33*c* of the third chamber 33*b*.

The first fluid passage 51, through which the first fluid passes, may be famed between the adjacent core elements 21 as the plurality of core elements 21 are spaced apart from each other at a specific interval, the first fluid introduced through the inlet port 12 of the housing 11 may pass through the first fluid passage 51 between the core elements 21, and the first fluid may exchange heat with the second fluid passing through the second fluid passage 25.

Figure 6:
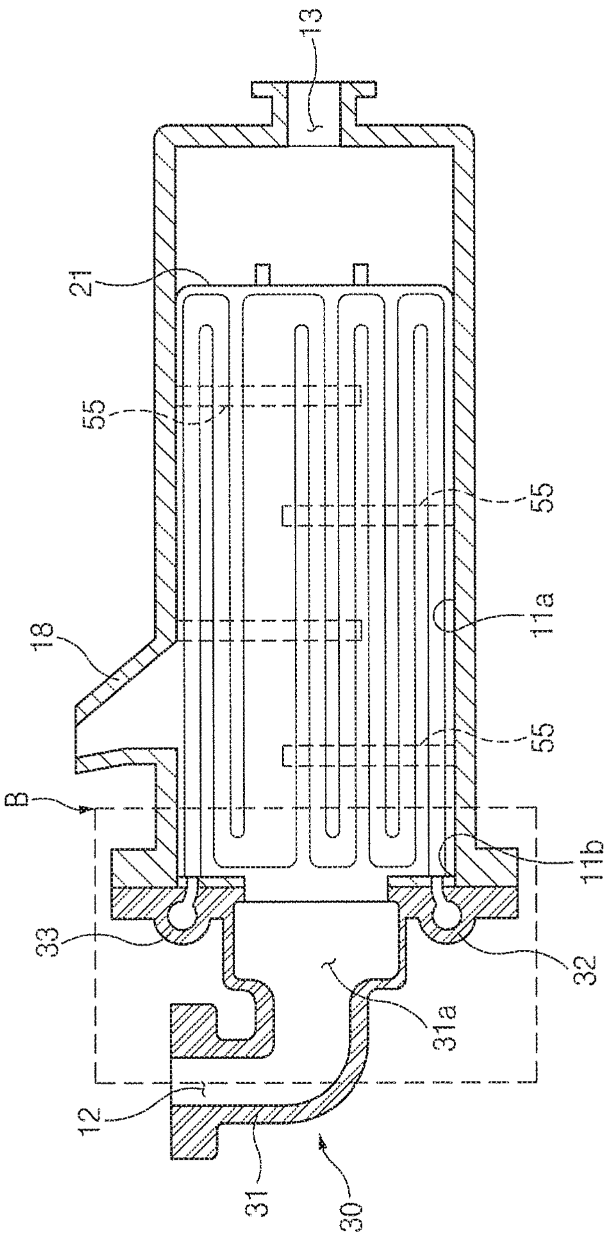
FIG. 6 is a sectional view taken along line A-A of FIG. 5.

As illustrated in FIGS. 6 and 9, a plurality of baffles 55 may be interposed in the first fluid passage 51 between the core elements 21. The baffles may prevent the core elements 21 from being distorted or deformed due to internal pressure and thermal deformation. As illustrated in FIG. 6, the plurality of baffles 55 may be disposed in zigzags when viewed from a side, and accordingly, the cooling efficiency of the EGR gas may be further improved as the working fluid flows in zigzags.

As illustrated in FIG. 9, a fitting projection 28 may be formed at a front end of the core element 21, and the fitting projection 28 of the core element 21 may be inserted into and coupled to the fitting groove 38 of the header 30. Through this, the plurality of core elements 21 may be spaced apart from each other along a horizontal direction, and accordingly, the first fluid passage 51 between the core elements 21 may be constantly maintained.

Figure 10:
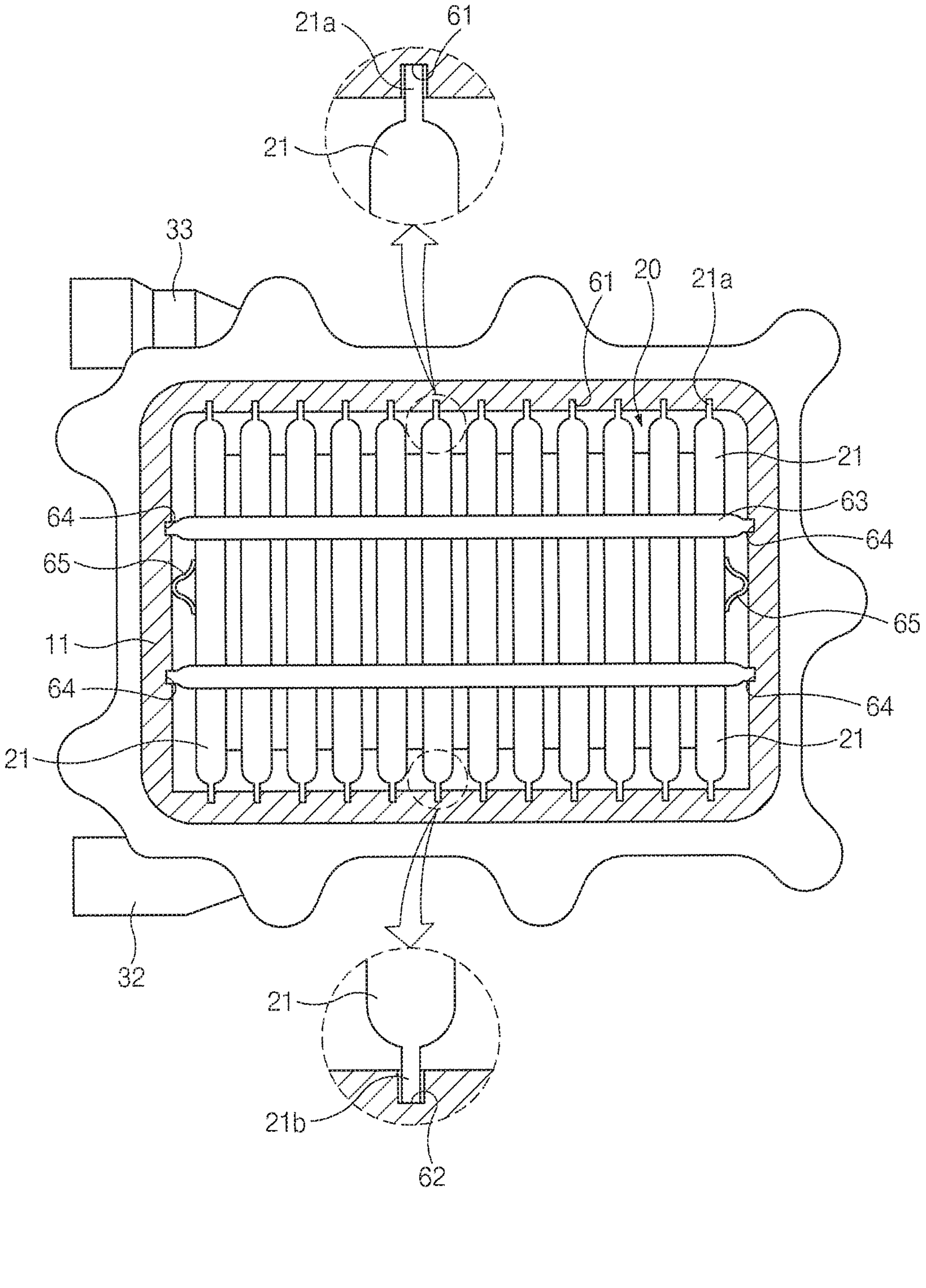
FIG. 10 is a sectional view taken along line E-E of FIG. 4.

As illustrated in FIGS. 7 and 10, an upper end 21*a* of the core element 21 may be coupled to a top of the housing 11. A plurality of upper grooves 61 may be formed on the top of the housing 11, and the upper grooves 61 may extend along longitudinal direction of the housing 11. Accordingly, the upper ends 21*a* of the core elements 21 may be inserted into and coupled to the upper grooves 61.

As illustrated in FIGS. 7 and 10, a lower end 21*b* of the core element 21 may be coupled to a bottom of the housing 11. A plurality of lower grooves 62 may be formed on the bottom of the housing 11, and the lower grooves 62 may extend along a longitudinal direction of the housing 11. Accordingly, the lower ends 21*b* of the core elements 21 may be inserted into and coupled to the lower grooves 62.

In this way, because the front ends of the core elements 21 are coupled to the header 30, the upper ends of the core elements 21 are coupled to the top of the housing 11, and the lower ends of the core elements 21 are coupled to the bottom of the housing 11, the core elements 21 may be installed in the interior space 11*a* of the housing 11 very stably.

Further, rear ends of the core elements 21 may be supported by the support member 63. The support member 63 may extend to cross the housing 11 in a transverse direction of the housing 11, and the support member 63 may connect opposite ends of the core elements 21 in a transverse direction of the housing 11.

The support member 63 may have a plurality of grooves 63*a* spaced apart from each other at a specific interval, and the interval between the grooves 63*a* of the support member 63 may be the same as the interval between the core elements 21.

As rear ends 21*c* of the core elements 21 are inserted into and coupled to the grooves 63*a* of the support member 63, the rear ends 21*c* of the core elements 21 may be connected to each other by the support member 63 in a longitudinal direction of the support member 63.

The opposite ends of the support member 63 may be detachably coupled to opposite inner surfaces of the housing 11, and through this, the opposite ends of the core elements 21 may be stably supported by the housing 11 through the support member 63.

In more detail, as illustrated in FIGS. 9 and 10, side grooves 64 may be formed on opposite inner surfaces of the housing 11, and the side grooves 64 may extend in longitudinal direction of the housing 11. Further, projections 63*b* may be formed at opposite ends of the support member 63, and the projections 63*b* of the support member 63 may be coupled to the side grooves 64 of the housing 11 through the support member 63.

Because the upper ends and the lower ends of the core elements 21 are coupled to the top and the bottom of the housing 11, the front ends of the core elements 21 are coupled to the header 30, and the rear ends of the core elements 21 are supported by the support member 63, the upper ends, the lower ends, and the front ends of the core elements 21 may be firmly supported by the housing 11, and accordingly, the core elements 21 may be stably supported against vibration, pressure, and thermal deformation. Thus, the durability of the core elements 21 may be improved.

Further, because the upper ends 21*a* and the lower ends 21*b* of the core elements 21, and the support member 63 are detachably coupled to the housing 11, the core elements 21 of the heat exchange core 20 may be easily separated from and assembled in the housing 11. Accordingly, the interior space 11*a* of the housing 11 and the core elements 21 of the heat exchange core 20 may be washed easily.

According to an embodiment of the present disclosure, when the first fluid is EGR gas or exhaust gas, a washing water injection hole 18 for injecting washing water may be formed on one side of the housing 11. Because the washing water is injected into the interior space 11*a* of the housing 11 through the washing water injection hole 18, the particulate matters of the EGR gas or exhaust gas attached to the core elements 21 of the heat exchange core 20 may be easily washed, and accordingly, the heat transfer performance may be improved.

Further, the core elements 21 may be elastically supported against the inner surface of the housing 11 by two or more elastic members 65. As illustrated in FIGS. 9 and 10, the two or more elastic members 65 may be symmetrically installed on the inner surface of the housing 11, and the elastic members has a leaf spring structure extending in a longitudinal direction of the housing 11, and accordingly, the core elements 21 may be elastically supported on opposite sides. The plurality of elements 21 may be more stably supported against pressure, vibration, and thermal deformation by the elastic elements 65.

According to the present disclosure, because the first fluid of a relatively high temperature passes between the housing and the heat exchange core and the second fluid of relatively low temperature circulates in the interior of the heat exchange core, the heat transfer efficiency may be remarkably improved while durability and pressure-resistant property may be satisfied.

Further, according to the present disclosure, because a structure that may be easily assembled and separated is applied, the interior of the housing and the heat exchange core may be effectively washed and the degree of freedom of design and the reliability of the components may be improved together.

Although the detailed embodiment of the present disclosure has been described until now, the present disclosure is not limited to the embodiment disclosed in the specification and the accompanying drawings, and the present disclosure may be variously modified by those skilled in the art without departing from the technical spirit of the present disclosure.

What is claimed is:

1. A heat exchanger for a vehicle comprising:

a housing having an interior space, through which a first fluid passes;

a header installed at one end of the housing, and having a first fluid inlet manifold, through which the first fluid is introduced, a second fluid inlet manifold, through which a second fluid is introduced, and a second fluid outlet manifold, through which the second fluid is discharged; and a heat exchange core installed in the interior space of the housing and having a plurality of core elements spaced apart from each other, wherein the plurality of core elements are coupled to the header, and a plurality of first fluid passages, through which the first fluid passes, are respectively formed between adjacent core elements, wherein each of the plurality of core elements has a second fluid passage, through which the second fluid flows, an inlet of the second fluid passage communicates with the second fluid inlet manifold, and an outlet of the second fluid passage communicates with the second fluid outlet manifold, and wherein the header has a plurality of communication apertures communicating with a first chamber of the first fluid inlet manifold, and communicating with the plurality of first fluid passages, respectively, wherein the header has a plurality of fitting grooves alternately arranged between the plurality of communication apertures, and wherein a front end of each of the plurality of core elements is respectively coupled to the plurality of fitting grooves.

2. The heat exchanger of claim 1, wherein the first fluid inlet manifold includes an inlet port, through which the first fluid is introduced, at one end of the first fluid inlet manifold, and the first chamber, which communicates with the inlet port, is disposed in an interior of the first fluid inlet manifold.

3. The heat exchanger of claim 1, wherein the second fluid inlet manifold includes:

a second fluid inlet port, through which the second fluid is introduced; and a second chamber communicating with the second fluid inlet port.

4. The heat exchanger of claim 3, wherein a plurality of communication passages, which communicate with the second chamber, are disposed inside a back portion of the header, and wherein the plurality of communication passages are connected to inlets of the plurality of core elements, respectively.

5. The heat exchanger of claim 1, wherein the second fluid outlet manifold includes a second fluid outlet port, through which the second fluid is discharged, at an end of the second fluid outlet manifold, and wherein the second fluid outlet port, which communicates with a third chamber, is disposed in an interior of the second fluid outlet manifold.

6. The heat exchanger of claim 5, wherein a plurality of communication passages, which communicate with the third chamber, are disposed inside a back portion of the header, and wherein the plurality of communication passages are connected to outlets of the plurality of core elements, respectively.

7. The heat exchanger of claim 1, wherein each of the core elements includes a pair of opposing half shells which are joined together, and wherein each of the pair of opposing half shells includes a groove therein.

8. The heat exchanger of claim 1, wherein a plurality of baffles are interposed between the core elements.

9. The heat exchanger of claim 1, wherein the front ends of the core elements are detachably inserted into and coupled to the header.

10. The heat exchanger of claim 1, wherein upper ends of the core elements are detachably coupled to a top of the housing.

11. The heat exchanger of claim 1, wherein lower ends of the core elements are detachably coupled to a bottom of the housing.

12. The heat exchanger of claim 1, wherein rear ends of the core elements are connected to each other to be supported by a support member.

13. The heat exchanger of claim 12, wherein opposite ends of the support member are detachably coupled to opposite inner surfaces of the housing.

14. The heat exchanger of claim 1, wherein the core elements are elastically supported against an inner surface of the housing by two or more elastic members.

15. The heat exchanger of claim 1, wherein the housing includes a washing water injection hole for injecting washing water on one side of the housing.

* * * * *